US009095936B2

(12) United States Patent
McIsaac et al.

(10) Patent No.: US 9,095,936 B2
(45) Date of Patent: Aug. 4, 2015

(54) VARIABLE MELTING POINT SOLDERS

(75) Inventors: Douglas J. McIsaac, Ancaster (CA);
Mark A. Whitney, Waterloo (CA);
Stephen F. Corbin, Halifax (CA)

(73) Assignee: DYNAJOIN CORPORATION, Cambridge, ON (CA)

( * ) Notice: Subject to any disclaimer, the term of this patent is extended or adjusted under 35 U.S.C. 154(b) by 309 days.

(21) Appl. No.: 13/218,908

(22) Filed: Aug. 26, 2011

(65) Prior Publication Data

US 2012/0055586 A1 Mar. 8, 2012

Related U.S. Application Data

(63) Continuation of application No. PCT/CA2011/050482, filed on Aug. 10, 2010.

(60) Provisional application No. 61/377,302, filed on Aug. 26, 2010.

(51) Int. Cl.
*B23K 35/26* (2006.01)
*B23K 1/00* (2006.01)
*B23K 31/02* (2006.01)

(52) U.S. Cl.
CPC ............. *B23K 35/262* (2013.01); *B23K 1/0008* (2013.01); *B23K 31/02* (2013.01); *B23K 35/26* (2013.01); *B23K 35/264* (2013.01)

(58) Field of Classification Search
CPC .......................................... B23K 35/26–35/264
USPC .............................. 148/24; 228/56.3; 420/589
See application file for complete search history.

(56) References Cited

U.S. PATENT DOCUMENTS

| | | | |
|---|---|---|---|
| 4,740,252 A | 4/1988 | Hasegawa et al. | |
| 4,834,794 A | 5/1989 | Yagi et al. | |
| 5,229,070 A | 7/1993 | Melton et al. | |
| 5,328,521 A | 7/1994 | Keusseyan | |
| 5,376,403 A | 12/1994 | Capote et al. | |
| 5,382,300 A | 1/1995 | Blonder et al. | |
| 5,389,460 A | 2/1995 | Oswald et al. | |

(Continued)

FOREIGN PATENT DOCUMENTS

WO WO02099146 * 12/2002 .............. C22C 13/00

OTHER PUBLICATIONS

International Search Report for PCT/CA2011/050482 to Dynajoin Corporation et al., mailed Dec. 1, 2011.

(Continued)

*Primary Examiner* — Brian Walck
(74) *Attorney, Agent, or Firm* — Lynn C. Schumacher; Hill & Schumacher

(57) ABSTRACT

The present invention relates to variable melting point solder formulations. The solder is comprised of at least one base metal or base metal alloy, preferably alloyed with at least one melting point depressant metal, such that the solidus point of the solder composition is reduced to an initial solidus temperature. Said base metal or base metal alloy, alloyed with at least one melting point depressant metal is mixed with at least one additive metal or additive metal alloy. When heated to a process temperature above said initial solidus temperature, a reaction occurs between the melting point depressant metal, and the additive metal, such that solidification occurs at the process temperature via the formation of intermetallic phases, effectively increasing the solidus of the base metal, and of the overall solder.

25 Claims, 13 Drawing Sheets

(56) References Cited

U.S. PATENT DOCUMENTS

| | | | |
|---|---|---|---|
| 5,540,379 | A | 7/1996 | Kazem-Goudarzi et al. |
| 5,803,340 | A | 9/1998 | Yeh et al. |
| 5,928,404 | A | 7/1999 | Paruchuri et al. |
| 6,613,123 | B2 | 9/2003 | Corbin et al. |
| 7,017,795 | B2 | 3/2006 | Liu et al. |
| 2007/0227627 | A1 | 10/2007 | Suh et al. |

OTHER PUBLICATIONS

Lu et al., Forming High Temperature Solder Interfaces by Low Temperature Fluxless Processing, Intel Corporation, The Henry Samueli School of Engineering and Applied Science, University of California, Los Angeles 2007.

Tao et al., D:Selective Interfacial Reaction between Ni and Eutectic BiSn Lead-Free Solder, Chem. Mater., 2001, 13 (3), pp. 1051-1056, Publication Date (Web): Feb. 15, 2001.

\* cited by examiner

VARIABLE MELTING POINT SOLDERS

CROSS REFERENCE TO RELATED U.S APPLICATION

This patent application relates to, and claims the priority benefit from, U.S. Provisional Patent Application Ser. No. 61/377,302 filed on Aug. 26, 2010, entitled "VARIABLE MELTING POINT SOLDERS" which is incorporated herein by reference in its entirety.

FIELD OF THE INVENTION

This invention relates to solder materials, and more specifically variable melting point (VMP) solders.

BACKGROUND OF THE INVENTION

Solders are typically used in the microelectronics industry to join microelectronic circuit elements and packages (die, wafer, chip, etc) to each other and/or onto a circuit board. A solder may be present as a paste, as a metallization, metal layer or metal coating onto one or more joining surfaces, or as preforms placed upon the surfaces to be joined. These metalized surfaces or preforms may be used in a fluxless process such as thermo-compression bonding, or in conjunction with a chemical flux to promote melting, wetting, and metallurgical interaction between the surfaces to be joined. Depositing metallic layers or coatings is a common approach used during wafer level packaging (WLP) such as Au—Au and Cu—Cu thermo-compression bonding. It is also used in the hermetic sealing of microelectromechanical systems (MEMS), and for the joining of laser diodes to heat sinks in optoelectronic applications.

Conventional soldering involves the use of solder pastes, which are mixtures of metal powders and various chemical additives to improve the rheological, chemical, and mechanical characteristics of the pastes. The metal powders present in conventional solder pastes are of a uniform composition, either a pure metal or metal alloy (mixture of metallic elements). The melting point of conventional solder pastes is defined by the melting point of the metal powders contained therein. When these conventional solder pastes are heated to a soldering temperature above their corresponding melting point (or liquidus if not a eutectic), they become fully liquid, wet the surfaces/components to be joined, and are subsequently cooled to solidify as a uniform metallurgical joint. Upon reheating, the solder joint will exhibit the same (or similar) melting behavior as during the initial soldering step.

To comply with the Restriction of Hazardous Substances (RoHS) and Waste Electrical and Electronic Equipment (WEEE) directives, the microelectronics industry transformed from using a conventional Pb—Sn eutectic solder, to any number of Pb-free solders. The primary Pb-free solders adopted by the microelectronics industry have melting temperatures that are higher than the conventional Pb—Sn eutectic solders, and as a result require higher furnace and reflow temperatures during the soldering process. These increased temperatures have an adverse effect on the microelectronic components and printed circuit boards (PCB), and can cause chip failure and/or PCB warpage.

There are several RoHS compliant conventional solders that have melting temperatures below that of the conventional Pb—Sn solders, however the melting temperature of these conventional solders are too low for safe operation in many standard service environments. It is therefore desirable to have a solder that is capable of being processed at lower melting temperatures relative to the currently adopted Pb-free solutions, yet retain the thermal reliability during service/operation that would be displayed by a higher melting temperature solder. Since conventional solders cannot meet both of these requirements, a non-conventional solder is required.

Some prior art seeks to use a low-melting point and high-melting point material within a solder, to achieve both the low-temperature joining requirements and high temperature reliability as outlined above. U.S. Pat. Nos. 4,740,252, 5,328, 521, 5,928,404, and 7,017,795 describe composite solders that comprise a low-melting material that, when heated beyond its melting point to a soldering temperature, wets both the joining surfaces and high-melting particles dispersed therein. Subsequent cooling solidifies the low-melting material and forms a composite solder joint that consists of the high-melting particles dispersed throughout.

U.S. Pat. No. 5,540,379 discloses a soldering process that utilizes two separate solder powders with differing melting points, said powders being heated in a two-stage reflow process. During heating above the low-melting solder powder (a tin-lead-bismuth alloy), a substantially flat solder surface is formed on the solderable portions of a PCB. This layer of solder consists of an aggregate-like structure of the unreflowed high temperature solder powder (a tin-lead-silver alloy) distributed within a matrix of the reflowed or melted low temperature solder powder. Components can then be placed upon said solder surface, and the assembly is heated to a reflow temperature above that of the high melting solder powder to form a solder fillet between the solderable portions of the component and the PCB.

Prior art exists that seeks to use solder powders of different types having different melting points. U.S. Pat. No. 5,382,300 discloses a solder paste that uses two separate types of solders that have different melting points, one of which is a eutectic or near-eutectic Pb—Sn alloy powder, the other component comprised of an elemental or alloy powder. The soldering temperature is chosen so that both solders liquefy, however the differing melting points of the two solders ensure that the solder paste does not melt homogeneously.

U.S. Pat. No. 5,803,340 discloses a solder paste composition that uses two separate solder powders with differing melting points. This solder paste acts as a composite solder during a flip chip bumping process. The low-melting solder employed is chosen such that it melts at or below a bumping reflow temperature, and this temperature does not degrade a photoresist mask. Upon removing the photoresist mask, the chip is reheated to a chip mount reflow temperature that is higher than the bumping reflow temperature, and sufficient to melt both the low and high melting solders. This yields a homogeneous alloy possessing a Pb content between that of the original solder powders, and higher solidus and liquidus than the alloy powder of the low-melting solder.

U.S. Pat. No. 5,376,403 discloses conductive adhesive compositions which include a solder powder and high-melting particles dispersed throughout a conductive ink, wherein said compositions are ideally suited for creating the conductive paths on printed circuits. The high-melting particles are added to the conductive adhesive to improve electrical conductivity over conductive polymer thick films. The connection of these high-melting particles by the low-melting material further improves the electrical conductivity of the pastes. Through dissolution of the high-melting particles into the low-melting liquid, the composition of the low-melting material changes increasing its melting temperature. This causes the conductive ink to resist melting at common soldering temperatures.

U.S. Pat. No. 5,389,160 discloses a solder paste, comprising a mixture of a first metal powder and a second metal powder dispersed in an expendable vehicle, said first metal powder composed of an alloy of tin and bismuth having a melting temperature, said second metal powder chosen from the group of gold and silver and present in an amount sufficient to dissolve into the liquid of said first metal powder to increase the melting temperature thereof. U.S. Pat. No. 5,429,292 discloses a method for forming a solder connection using this solder paste.

U.S. Pat. No. 5,229,070 discloses a solder composition wherein a first metal powder containing predominantly tin having a first melting temperature, and a second solder powder being a tin alloy containing elements from the group consisting of indium and bismuth, and having a second melting temperature less than the first melting temperature. This solder composition is heated to a temperature above the second melting temperature to form a liquid that initiates wetting of a faying surface, and is subsequently heated to a higher temperature to promote complete liquefaction of the first metal powder. The fully liquid solder is then cooled to form a joint that possesses a solidus temperature above the liquidus temperature of the second solder powder.

U.S. Pat. No. 6,613,123 discloses solder compositions which display a variable melting point. Said solder compositions comprise a metal or metal alloy powder having a low melting point with a metal powder having a higher melting point. Upon heating to a process temperature, in-situ alloying occurs between the low and high melting point powders such that solidification occurs at the solder temperature with little or no intermetallic phase formation, thus creating a new higher solidus (or melting) temperature.

U.S. Pat. No. 4,834,794 discloses a solder composition comprising a solder powder selected from the group consisting of Sn and Pb, containing a metal additive selected from the group consisting of Bi, In, and Cd, to depress the melting point of said solder powder, mixed with an alloy powder formed from elements selected from the group consisting of Se, Te, and Tl, and elements from the group consisting of Sn and Pb. Upon heating to a soldering temperature of at most 130° C., said alloy powder reacts with said additive metal to cause the soldering layer to have a remelting temperature higher than a melting point of the solder composition or solder powder.

SUMMARY OF THE INVENTION

The present invention generally provides a composition for soldering, comprising:
a base metal comprising one of In, Bi and Sn;
at least one melting point depressant metal different from said base metal, said at least one melting point depressant metal comprising one of In, Bi, Sn, and combinations thereof; and
an additive metal comprising one of Ni, Sb, and combinations thereof;
wherein the composition has an initial solidus temperature; and
wherein after forming an intermetallic phase between the additive metal and the at least one melting point depressant metal, the composition is a solid and has a final solidus temperature greater than the initial solidus temperature.

The present invention also generally provides a method of soldering, comprising the steps of:
providing a composition for soldering to a solderable surface or faying surface, the composition comprising:
a base metal comprising one of In, Bi and Sn;
at least one melting point depressant metal different from said base metal, said at least one melting point depressant metal comprising one of In, Bi, Sn, and combinations thereof;
an additive metal comprising one of Ni, Sb, and combinations thereof;
wherein the composition has an initial solidus temperature; and
forming an intermetallic phase between the additive metal and the at least one melting point depressant metal, thereby raising the solidus temperature of the composition to a final solidus temperature greater than the initial solidus temperature.

In one embodiment of the invention, the base metal and the at least one melting point depressant metal are an alloy prior to forming the intermetallic phase. This alloy may be a eutectic, and the eutectic may be InBi, InSn, SnBi, or InSnBi.

In some embodiments of the invention, the initial solidus temperature is in the range 60° C. to 200° C. In others, the final solidus temperature is greater than 230° C. In others, the final solidus temperature is at least 30° C. greater than the initial solidus temperature.

In another embodiment of the invention, the composition is formulated such that a solder joint created with the composition is substantially free of porosity.

In another embodiment of the invention, at least a portion of the composition is in the form of a powder, and the additive metal comprises 10-30 wt % of the composition.

In another embodiment of the invention, at least a portion of the composition is in the form of a metallization, metal layer or metal coating, and the additive metal comprises between 10-95 wt % of the composition.

In another embodiment of the invention the solidus temperature increases to the final solidus temperature over a nonzero period of time less than 12 hours, and preferably over a nonzero period of time less than 300 minutes.

in an embodiment of the invention wherein at least a portion of the composition including the additive metal is in the form of a powder, the additive metal is preferably chosen to have a nonzero preselected mean particle size less than 20 µm.

The present invention may be realized in many forms. In some embodiments of the invention, the additive metal, the base metal, and the at least one melting point depressant metal are each in a form selected from the group consisting of metallization, metal layer, metal coating, powder, foil, preform, ribbon, wire, and sheet.

In embodiments of the invention wherein at least a portion of the composition is in the form of a powder, the powder may be tape cast into a preselected shape. Further, the powder may be dispersed in at least a flux to form a paste. In some embodiments of the present invention comprising a paste, at least a portion of the composition may be in the form of a metallization, metal layer or metal coating, and the paste may be applied adjacent to the metallization, metal layer or metal coating. Further, the additive metal may be at least part of the portion which is a powder, and may be dispersed uniformly throughout the composition.

In an embodiment of the invention, the melting point depressant metal is Sn, the base metal is Bi, the additive metal is Ni, and the composition comprises 13-23 wt % Ni, 44-50 wt % Bi, 33-37 wt % Sn. In another embodiment, the melting point depressant metal is Sn, the base metal is Bi, the additive metal is Sb, and the composition comprises 20-30 wt % Sb, 40-46 wt % Bi, 30-34 wt % Sn. In another embodiment, the melting point depressant metal is Sn, the base metal is Bi, the additive metal is a mixture of Ni and Sb, and the composition comprises 1-13 wt % Ni, 1-25 wt % Sb, 43-50 wt % Bi, 31-36 wt % Sn.

In some embodiments of the invention, forming the intermetallic phase involves heating or pressurizing the composition. In other embodiments of the invention, forming the intermetallic phase involves both heating and pressuring the composition.

In an embodiment of the invention, the composition further comprises at least one alloying element selected from the group consisting of Ag, Al, As, Au, B, Be, Bi, C, Ca, Ce, Co, Cr, Cu, Fe, Ga, Ge, H, In, La, Mg, Mo, Mn, N, Nb, Ni, O, P, Pd, Po, Pt, Re, Rh, Sb, Se, Si, Sn, Te, Ti, Tl, V, W, Zn and Zr. In some embodiments, the at least one alloying element comprises less than 10 wt % of said composition.

A further understanding of the functional and advantageous aspects of the invention can be realized by reference to the following detailed description and drawings.

BRIEF DESCRIPTION OF THE DRAWINGS

Embodiments of the invention will now be described, by way of example only, with reference to the drawings, in which.

DETAILED DESCRIPTION

Figure 1A:
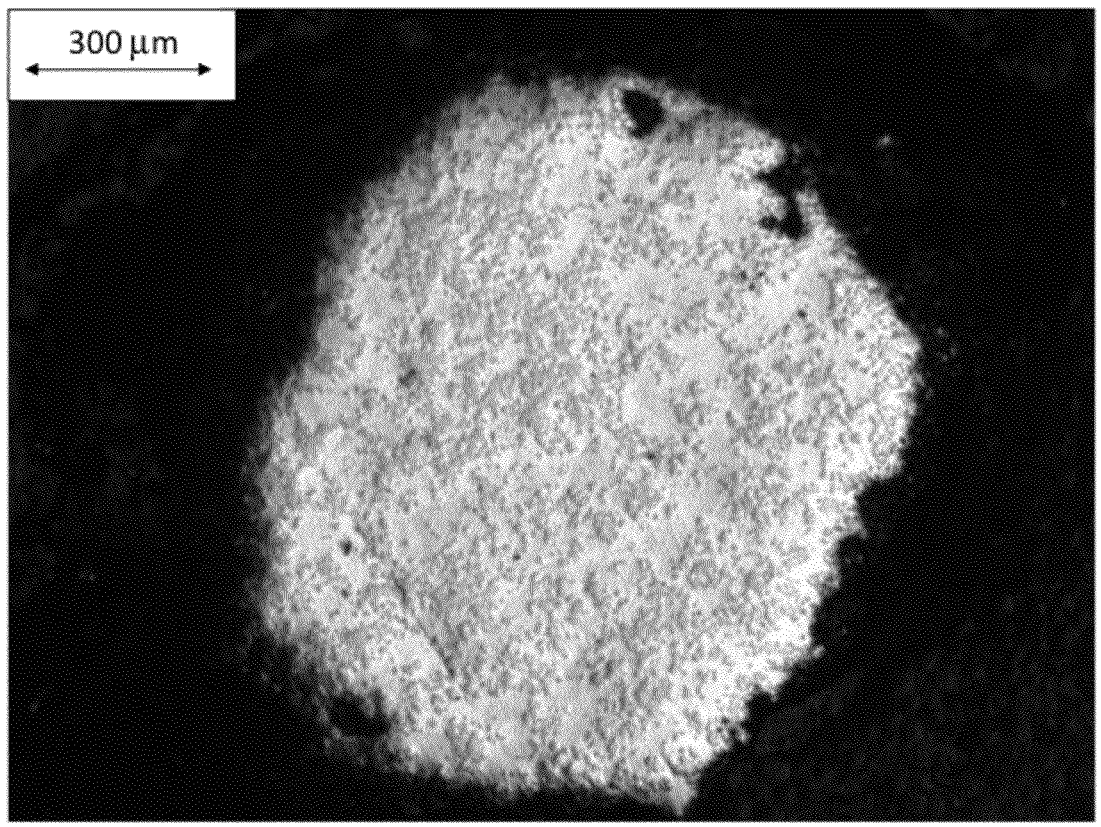
FIG. 1a shows an optical micrograph of a post processed solder paste comprised of 20 wt % Ni with SnBi eutectic.

As required, embodiments of variable melting point solders of the present invention are disclosed herein. However, the disclosed embodiments are merely exemplary, and it should be understood that the invention may be embodied in many various and alternative forms. The Figures are not to scale and some features may be exaggerated or minimized to show details of particular elements while related elements may have been eliminated to prevent obscuring novel aspects.

Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to a solder based on a ternary or quaternary system of elements, comprising one or a combination of nickel (Ni) and antimony (Sb), combined with bismuth (Bi) and tin (Sn).

As used herein, the term "about", when used in conjunction with ranges of dimensions, temperatures or other physical properties or characteristics is meant to cover slight variations that may exist in the upper and lower limits of the ranges of dimensions so as to not exclude embodiments where on average most of the dimensions are satisfied but where statistically dimensions may exist outside this region. For example, in embodiments of the present invention weight percentages of Ni are given but it will be understood that these are not meant to be limiting. Additionally, weight percentages stated for constituents of a solder paste are assumed to be stated relative to the total metals content of the paste, and these percentages do not account for the weight fraction of solder flux and chemical additives that may be included to form said solder paste.

As used herein, "solidus" is defined as the temperature below which a metal is fully solid, and "liquidus" is defined as the temperature above which a metal is fully liquid. At any temperature between the solidus and liquidus temperature of a metal, said metal exists as a mixture of solid and liquid phases, the proportions of which depend on the proximity of said temperature to the solidus and liquidus temperatures. Additionally, when specifying a "solidus" temperature for a solder composition, said "solidus" temperature is that below which all components of said solder composition are solid.

The present invention provides a variable melting point (VMP) solder composition. The purpose of a VMP solder composition is to provide a melting point shift (MPS), wherein the solidus of the composition increases outside of a process temperature range when it is soldered at a temperature within that process temperature range. The MPS achieved by VMP solders of the present invention are the result of component interactions to form intermetallic phases during the solder process, when the composition is heated to or above its initial solidus temperature. These interactions may occur and a suitable MPS may be achieved when only a portion of the solder composition has melted, or when the entire solder composition has melted. In preferable embodiments of the present invention, a suitable MPS is one which is greater than 30° C. While embodiments of the present invention are described wherein heat is used to form the intermetallic phases, pressure or a combination of heat and pressure may be used.

The VMP solders of the present invention have three general components: an additive metal or additive metal alloy (herein referred to as an additive metal for brevity, and should be construed to include additive metal alloys), a base metal or base metal alloy (herein referred to as a base metal for brevity, and should be construed to include base metal alloys), and at least one melting point depressant (MPD) metal. When the solder composition is heated to or above its initial solidus temperature, an intermetallic phase is formed between the additive metal and the MPD metal, raising the solidus of the solder composition. To achieve an effective MPS in the solder composition, the MPD metal is generally present in amounts greater than 10 wt % relative to said base metal.

It is understood that additional component elements may be added to a VMP solder composition to enhance the mechanical properties and/or melting behaviour of said composition, and these component elements may be present in amounts less than 10 wt %. Said component elements may include but are not limited to Ag, Al, As, Au, B, Be, Bi, C, Ca, Ce, Co, Cr, Cu, Fe, Ga, Ge, H, In, La, Mg, Mo, Mn, N, Nb, Ni, O, P, Pd, Po, Pt, Re, Rh, Sb, Se, Si, Sn, Te, Ti, Tl, V, W, Zn and Zr.

There are many possible variations in a VMP solder composition, and said composition may comprise a ternary, quaternary, or higher order system of elements. It is a goal of the present invention to provide RoHS compliant solder compositions, and as such materials such as Pb, Hg, and Cd preferably are not included in the compositions. A preferable embodiment of the invention comprises a system with Ni, Sb or combination thereof as an additive metal, with a base metal of In, Sn, Bi, or combination thereof, and an MPD metal of In, Sn, Bi or combination thereof. Another preferable embodiment of the invention comprises a system of Ni or Sb additive metal, a Sn MPD metal, and a Bi or In base metal.

In some embodiments of the invention, one or more of the additive metal, base metal, and MPD metal may be in the form of metallizations, metal layers or metal coatings. These metallizations, metal layers or metal coatings could be deposited directly onto the surfaces to be joined, or come from laminated preforms placed between the surfaces to be joined. In other embodiments of the invention, one or more of the additive metal, base metal, and MPD metal may be in the form of a powder. The metal powders may be mixed with a chemical flux to form a solder paste, or compacted (or tape cast) into preforms, wires, sheets, foils or ribbons. A suitable flux may be chosen from those commonly used in the art of making conventional solder pastes, with or without the addition of an activated fluxing agent. In a further embodiment of the invention, the additive metal may be in the form of a powder, with the base metal and melting point depressant metal present as a metallic coating on the surface of said additive metal powder. These metallic coatings may be separate and distinct, or they may be pre-alloyed on the surface of additive powder. In a further embodiment of the invention, at least a portion of the composition is in the form of a metallization, metal layer or metal coating and at least a portion of the composition is a paste, wherein the paste is applied adjacent to the metallization, metal layer or metal coating.

Since an objective of the present invention is to provide a VMP solder that displays a MPS to a final solidus temperature above that at which a soldering step is performed, it is advantageous that the initial solidus temperature of the VMP solder be as low as possible for the constituent metals that comprise it. In some preferable embodiments of the invention, the MPD metal may be pre-alloyed with the base metal; and for most base metals alloyed with a MPD metal, the composition that achieves the lowest possible initial solidus temperature is a eutectic composition. Although not required for a VMP solder to perform its function, a preferred embodiment when choosing a composition of MPD metal alloyed with base metal is a eutectic composition. In preferable embodiments of the invention, the initial solidus is in the range 60° C. to 200° C., and the final solidus is greater than 230° C.

In another embodiment of the present invention where the base metal is alloyed with the MPD metal, the alloy may be off-eutectic, and therefore have a solidus which is different from its liquidus. In such an embodiment, it may be desired that a soldering temperature be chosen such that it falls between the solidus and liquidus temperatures of the off-eutectic base metal alloy containing the MPD. This would result in an alloy of base metal and MPD that is not fully liquid at the soldering temperature, but may still provide a suitable MPS required of a VMP solder. In this embodiment, when the composition is heated to a soldering temperature at or above its initial solidus temperature, the base metal may melt to form a liquid alloy containing both base metal and MPD metal. This liquid alloy interacts with the additive metal creating an intermetallic phase between the MPD metal and the additive metal. This reduces the concentration of the MPD metal dissolved in said liquid alloy, and increases the liquidus of the base metal above the soldering temperature. If enough MPD metal is removed from the liquid alloy through intermetallic phase formation with the additive metal, then the solidus of the base metal may also be increased. Once the solidus of the base metal is increased above the soldering temperature, a MPS has effectively been achieved in the solder. In a preferred embodiment, if held at a soldering temperature at or above the initial solidus temperature of the solder composition, said liquid alloy will solidify isothermally, and will not remelt unless heated above said final solidus temperature.

When present as a solder paste during a soldering process, it may be important that there be enough liquid present to promote wetting of the surfaces to be joined, and to consolidate the paste into a dense solder joint. Conversely, for certain applications it may also be sought to form a solder joint having a desired level of porosity, and thus the joint need not be fully dense. Characteristic solder joint density can be related to the fraction of liquid present during the soldering process, and this liquid fraction is controlled by tailoring the properties and fractions of the constituent powders in the solder paste.

Different combinations of additive, base and MPD metal result in VMP compositions with different properties. Some properties which may be of interest for optimization include but are not limited to initial melting temperature, reaction kinetics (ie. percent liquid remaining after a hold time at the soldering temperature), resulting joint density, melting point shift, and electrical and mechanical characteristics.

Figure 1B:
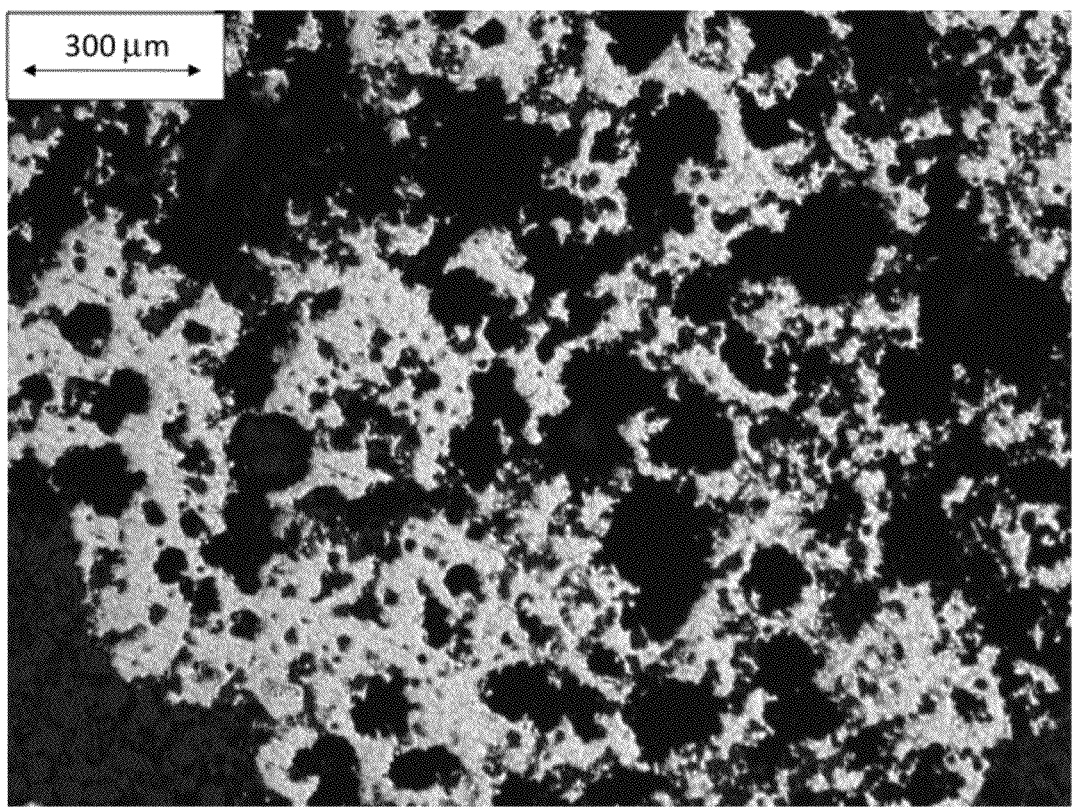
FIG. 1b shows an optical micrograph of a post processed solder paste comprised of 75 wt % Ni with SnBi eutectic.

The control of solder density when the constituents of the solder composition are in a powder form can be understood from FIG. 1 which shows the effect of Ni additive metal fraction on the resultant solder density. Solder compositions with low additive metal fractions (FIG. 1a) can be soldered such that they are substantially free of porosity, and solder compositions with high additive metal fractions (FIG. 1b) can be soldered such that they contain porosity. Conversely, when the constituents of the solder composition are in the form of metallizations, metal layers or metal coatings on the surfaces to be joined, high additive metal fractions can be used and still result in soldered joints that are substantially free of porosity.

Figure 2:
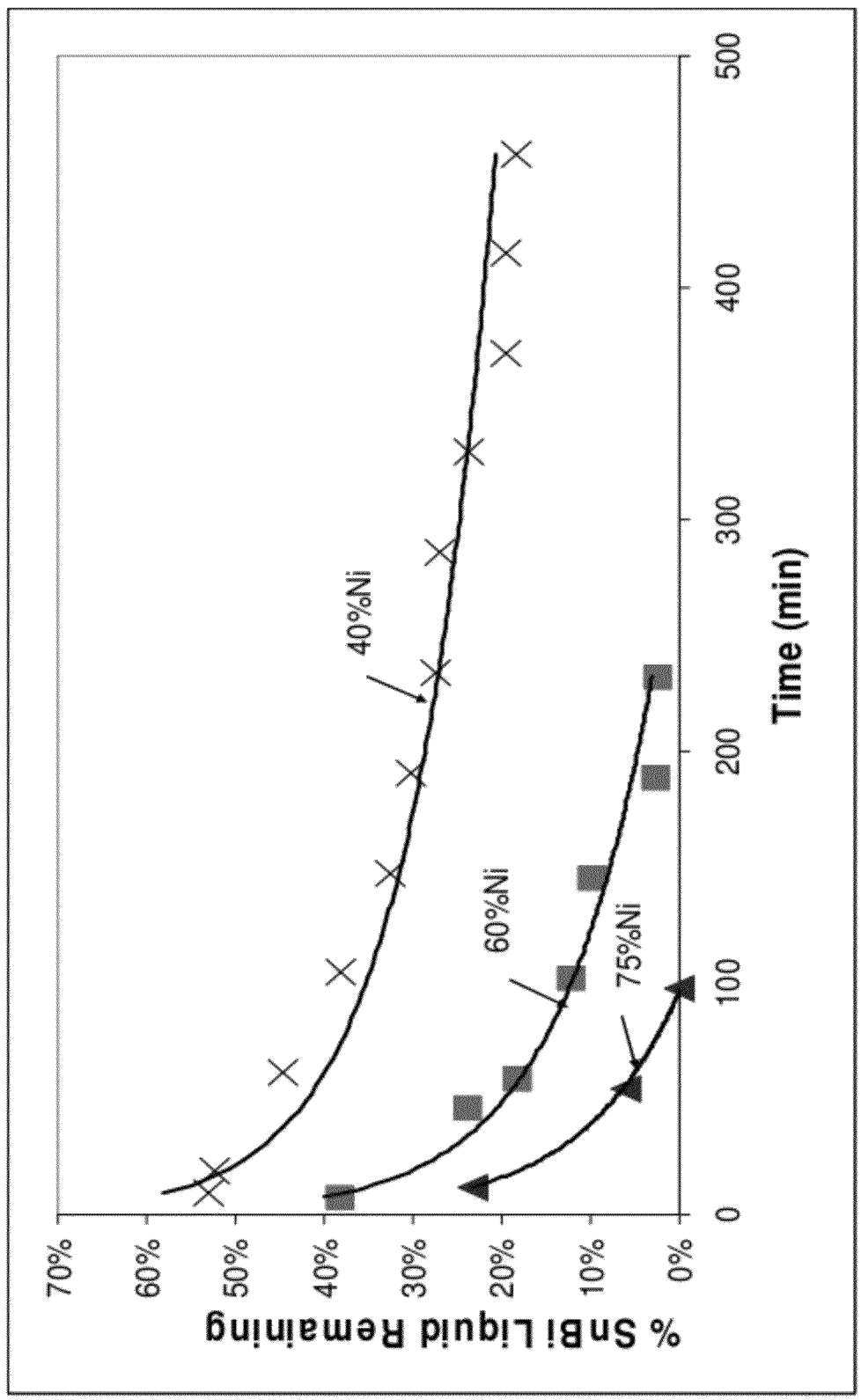
FIG. 2 shows the effect of Ni fraction on Ni—SnBi system kinetics.
Figure 3:
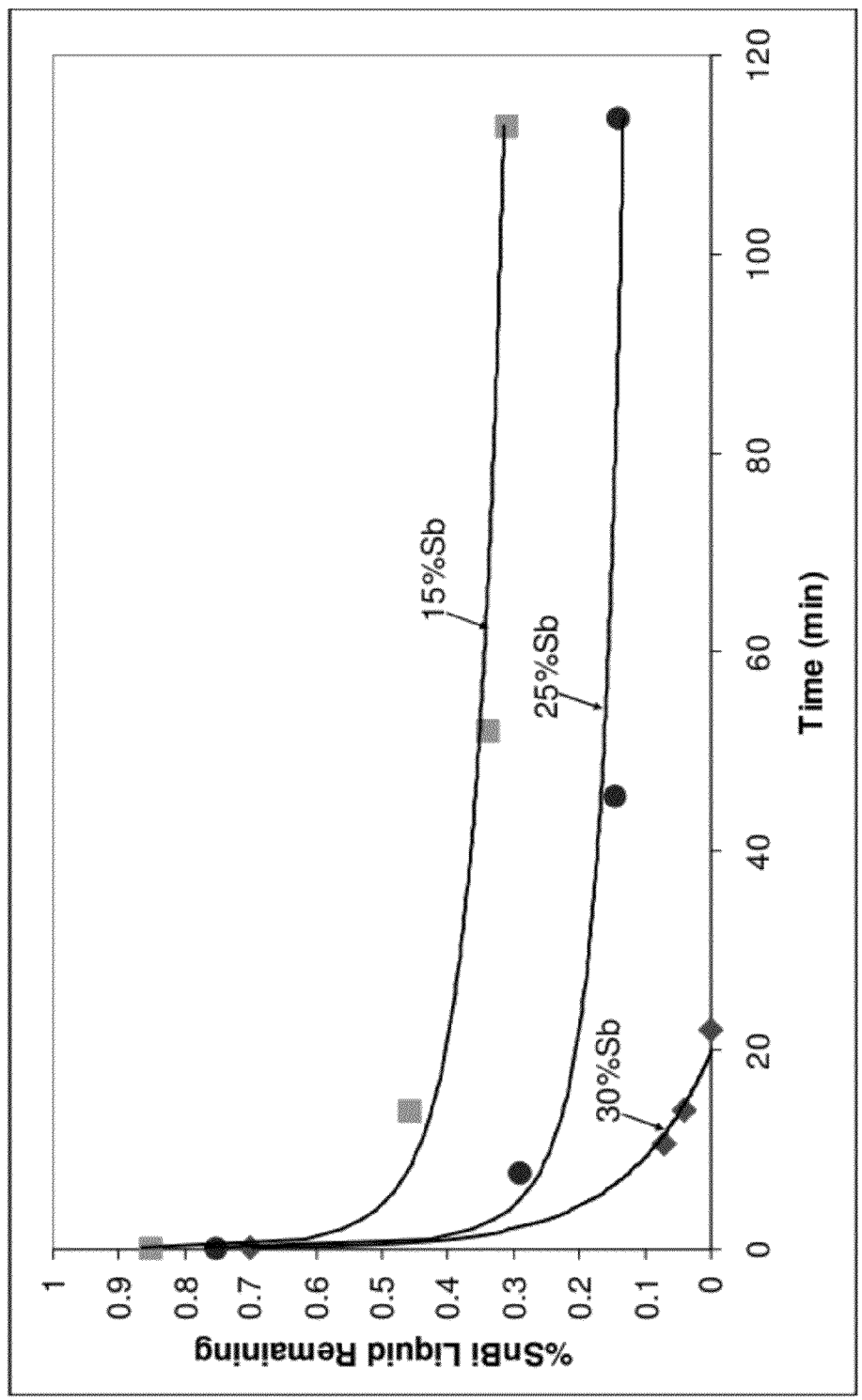
FIG. 3 shows the effect of Sb fraction on Sb—SnBi system kinetics.

In general, it is preferable that the solder solidify in less than 12 hours after subjecting it to the process temperature. More preferably, the solder is able to solidify in less than 300 minutes after subjecting it to the process temperature. Therefore, control of the reaction kinetics is important when considering the composition of a VMP solder. In order to control the reaction kinetics, the additive metal fraction in the solder composition may be varied. For embodiments when the constituents of the solder composition are in a powder form, the control of the reaction kinetics can be understood through FIG. 2 and FIG. 3, which show the effect of Ni and Sb additive metal powder fraction on the wt % of SnBi eutectic liquid remaining during soldering, respectively.

Increasing the additive metal powder fraction increases the rate of eutectic liquid removal (ie. rate of isothermal solidification), which allows the solder composition to achieve the desired MPS in a lower process time. Additionally, when considering the time required to achieve full isothermal solidification (ie. no liquid remaining at the soldering temperature) from FIG. 2 and FIG. 3, it can be seen that Sb as an additive metal provides improved reaction kinetics relative to Ni. At a soldering temperature of 160° C., an Sb additive fraction of 30 wt % achieves full isothermal solidification in 20 minutes compared with a Ni additive fraction of 75 wt % which achieves full isothermal solidification in 100 minutes.

Moreover, having a mixture of different additive metals in a solder composition can also be of importance in controlling the overall reaction kinetics.

Figure 4:
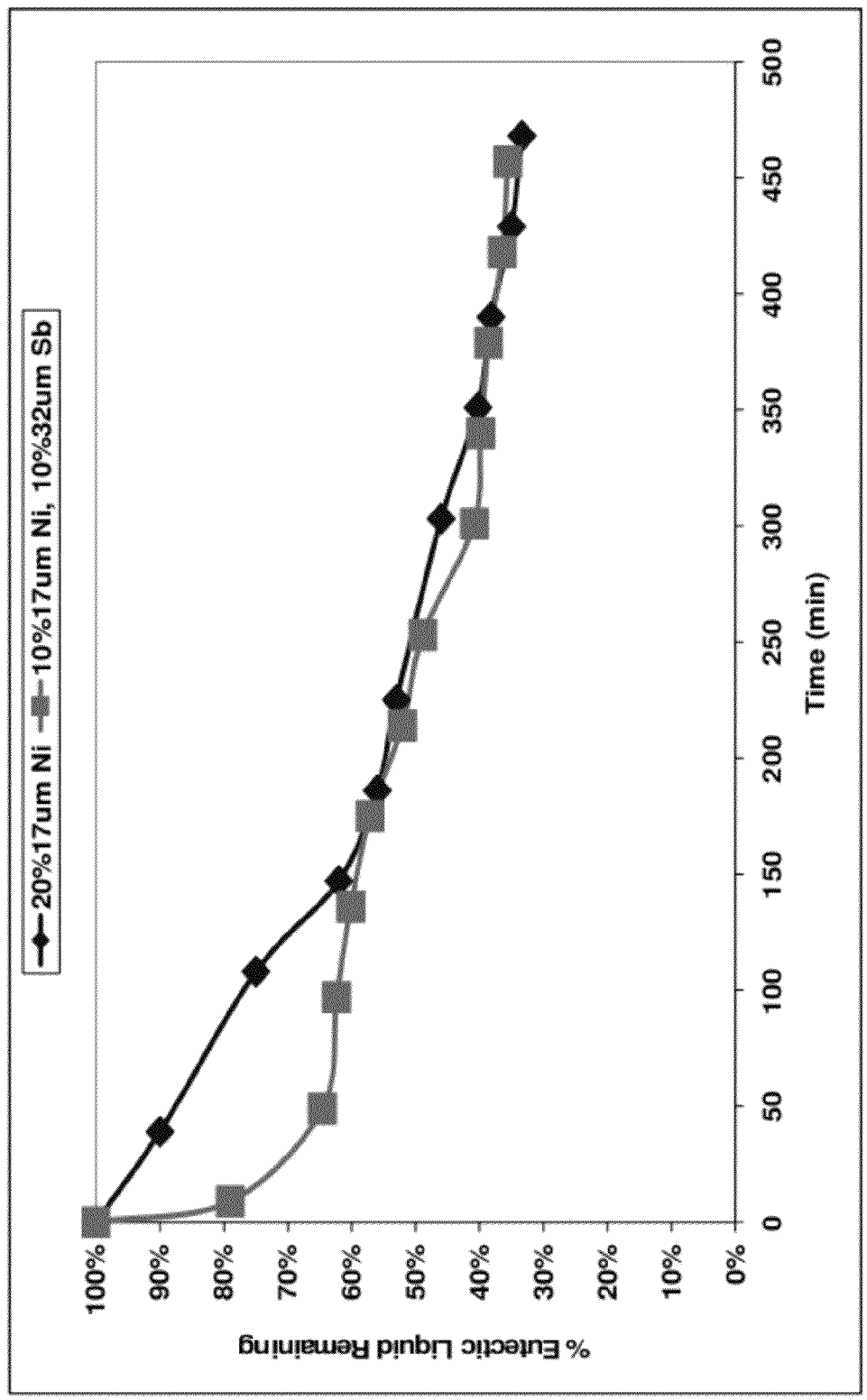
FIG. 4 compares the kinetics of ternary Ni—SnBi mixtures with quaternary Ni—Sb—SnBi mixtures.

It can be seen from FIG. 4 that the initial system kinetics and liquid removal rate are improved when the additive metal is present as a mixture of 10 wt % Ni and 10 wt % Sb, compared with only 20 wt % Ni. This comparison highlights the importance of additive metal type in a VMP solder composition, and that it is important when designing a VMP solder paste to have knowledge of the possible interactions between the base, additive and MPD metals. This knowledge allows for the careful control of the reaction kinetics between the constituent metals during soldering. Therefore, in embodiments of the present invention wherein at least a portion of the composition is in the form of a powder, it is preferable that the additive metal comprises from 10 to 30 wt % of the composition in order to achieve preferable reaction kinetics.

When the constituents of the solder composition are in the form of metallizations, metal layers or metal coatings on the surfaces to be joined, the reaction kinetics can be controlled in a number of ways. Firstly, if a high additive metal fraction is used, then a correspondingly low base and MPD metal fraction will be present. These fractions are directly related to the thicknesses of the metalized layers, and with a high additive fraction (ie. thick additive layers), the thickness of the base and MPD layers (or layer if the base and MPD are pre-alloyed) will be relatively small, which can lead to rapid isothermal solidification.

Secondly, having several metalized layers on the surfaces to be joined can also improve the reaction kinetics (ie. isothermal solidification time) by increasing the surface area of contact between the additive metal and the base, MPD metals. In an embodiment when the base and MPD metals are pre-alloyed, this improvement in reaction kinetics is accomplished by depositing alternating additive and base/MPD alloy layers on the surfaces to be joined. In embodiments of the present invention wherein at least a portion of the composition is in the form of a metallization, metal layer or metal coating, it is preferable that the additive metal comprises from 10 to 95 wt % of the composition in order to achieve preferable reaction kinetics.

Figure 5:
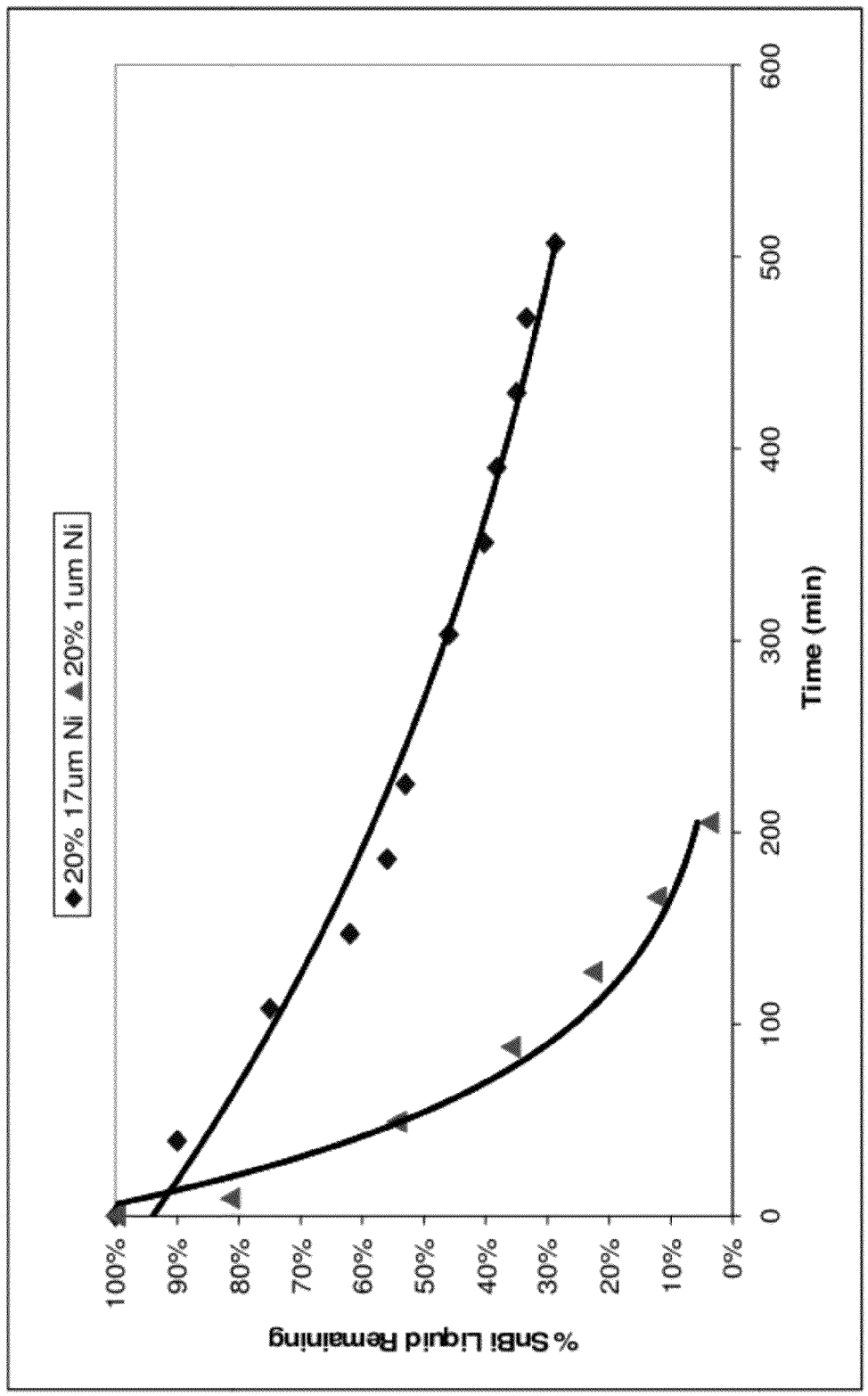
FIG. 5 shows the effect of powder size on system kinetics for solder pastes comprised of 20 wt % Ni with SnBi eutectic.

In embodiments of the invention where the constituents of the solder composition are in a powder form, the reaction kinetics of the solder composition may be controlled through control of the properties of the powder particles which can include, but are not limited to, powder composition, powder morphology, powder size and size distribution. For example, FIG. 5 teaches the effect of reducing the powder size of the additive Ni from a mean particle size of 17 μm to 1 μm. It is observed that significant kinetic improvements in isothermal solidifcation can be achieved when varying the additive metal powder size in such a manner.

Figure 6:
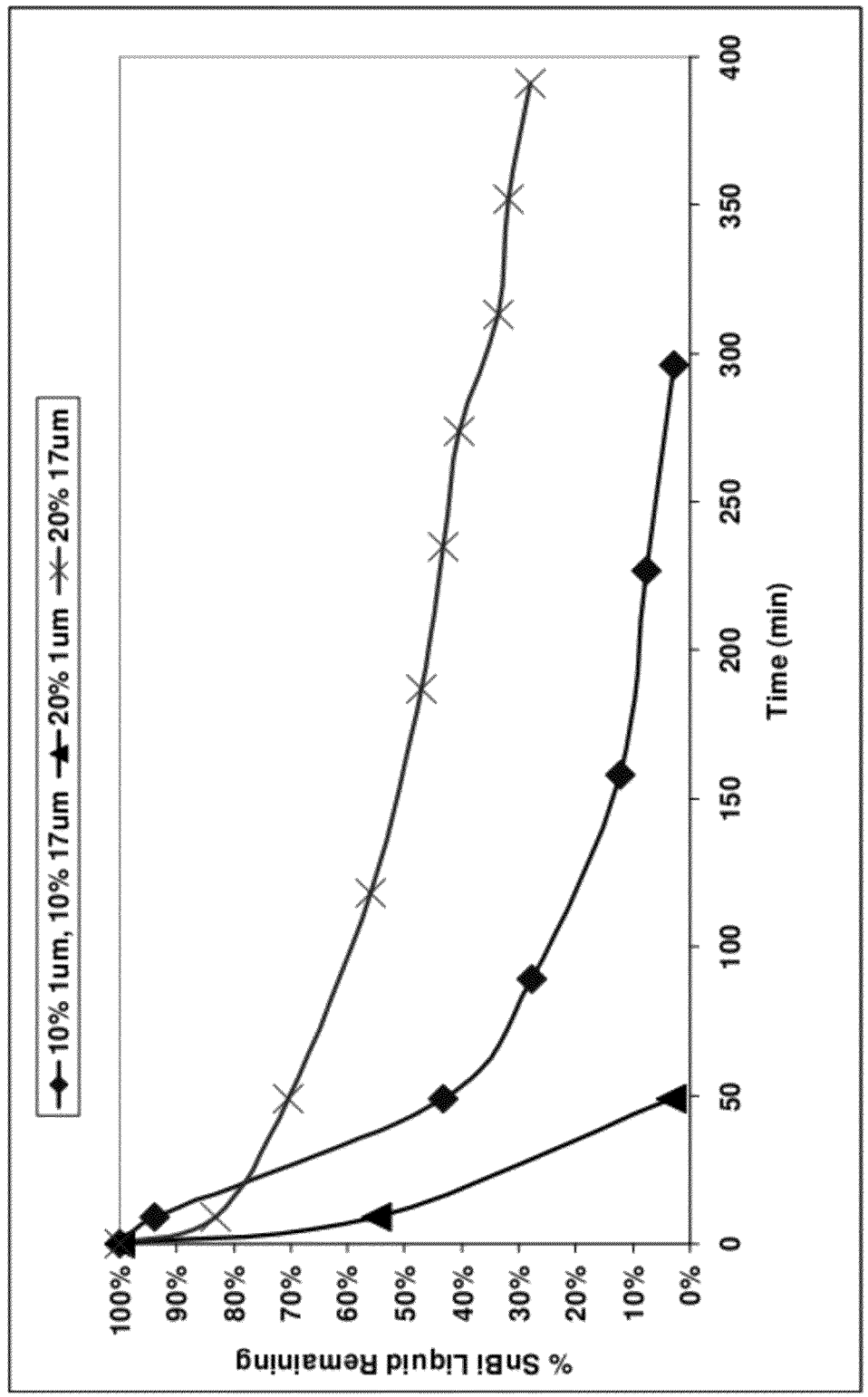
FIG. 6 shows the effects of a mixture of Ni powder sizes for solder pastes comprised of 20 wt % Ni with SnBi eutectic

Additionally, FIG. 6 teaches a method of combining different powder sizes of the same additive metal to control and tailor the reaction kinetics of a VMP solder composition. FIG. 6 shows that for a VMP solder paste containing 20 wt % Ni, intermediary reaction kinetics can be achieved when the Ni additive fraction is comprised of 10 wt % Ni powder of 1 μm mean particle size, and 10 wt % Ni powder of 17 μm mean particle size. In embodiments of the present invention where at least a portion of the constituents of the solder composition are in a powder form, it is preferable that the mean particle size of the powder is generally nonzero and less than 20 μm to achieve required reaction kinetics.

Further improvements in system kinetics (i.e. isothermal solidification rate) can be achieved by employing wet ball milling techniques standard in the art of blending powder mixtures. When compared with dry metal powder blending, the use of both an aqueous media and inert metal or ceramic milling media can aid in reducing the agglomeration of metal powders during the milling process. This results in a more uniform and homogeneous mixture of the metal powders, prior to mixing with a solder flux to form a solder paste.

Figure 7:
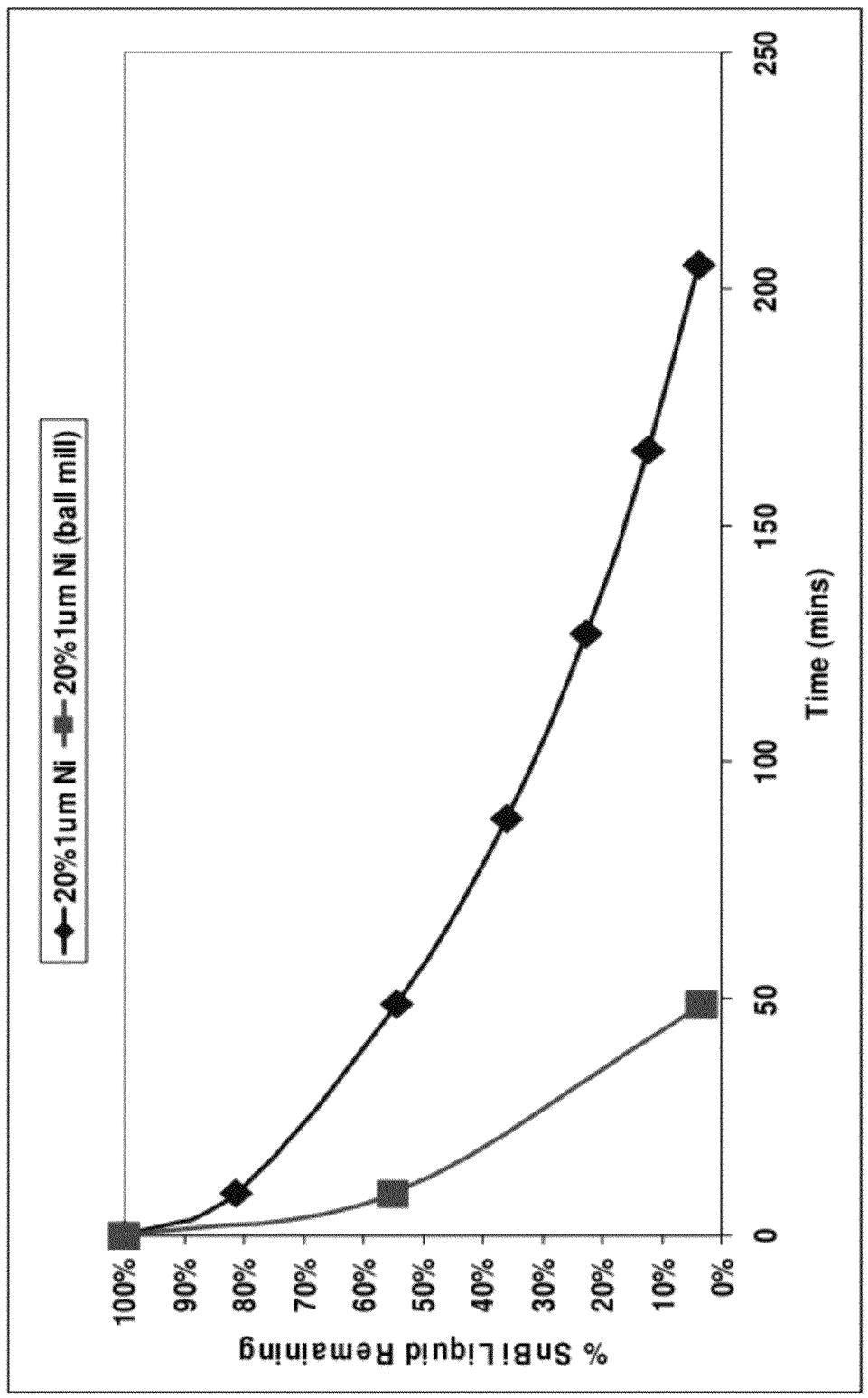
FIG. 7 shows the effect of milling technique on isothermal solidification kinetics for solder pastes comprised of 20 wt % 1 μm Ni with SnBi eutectic.

FIG. 7 shows the effect of employing a wet ball milling technique versus a dry powder blending technique prior to paste formulation, in the processing of a solder paste comprised of 20 wt % Ni additive metal. As can be seen, a substantial reduction in isothermal solidification time from 200 mins to 50 mins is achieved by ensuring an improved initial distribution of the Ni additive. Therefore, in preferable embodiments of the invention, the additive metal is uniformly dispersed throughout the composition prior to forming an intermetallic phase in order to achieve preferable reaction kinetics.

The following discussion of the exemplary Ni—SnBi and Sb—SnBi ternary systems is intended to be didactic and illustrative, and it is not the intention of this section to limit the present invention to any theory.

Figure 8:
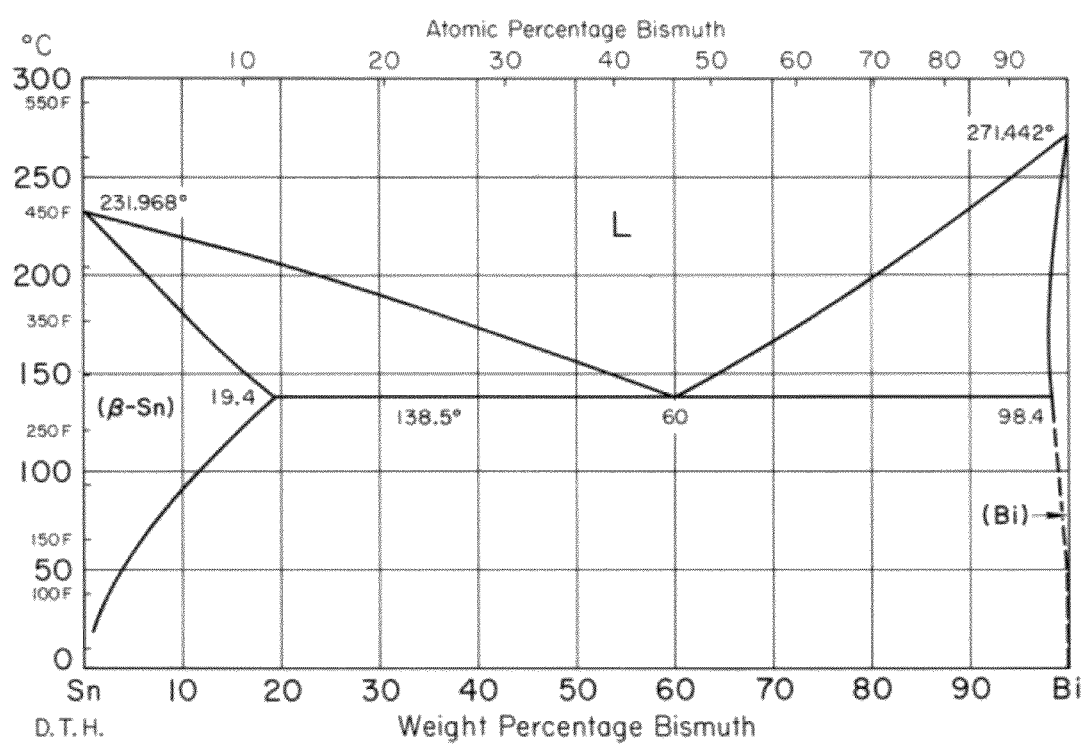
FIG. 8 shows the Sn—Bi binary alloy phase diagram.

In one exemplary embodiment, the base metal, melting point depressant metal, and additive metal are chosen to be Bi, Sn, and Ni respectively. The concentration of melting point depressant Sn pre-alloyed with base metal Bi was chosen such that the composition of the alloy was 42Sn/58Bi. This composition represents a eutectic composition in the Sn—Bi binary alloy system (FIG. 8), possessing a melting temperature of 139° C. In examining the reactions that occur in the Ni—Sn—Bi ternary composition, virtually no reaction occurs between Ni and Bi for compositions below 98 wt % Bi. As a result, one need consider only the Ni—Sn reactions to analyze the kinetics of this ternary system. In this system, the intermetallic phase formation between Ni and Sn is very thermodynamically favored, leading to fast kinetics.

Figure 9:
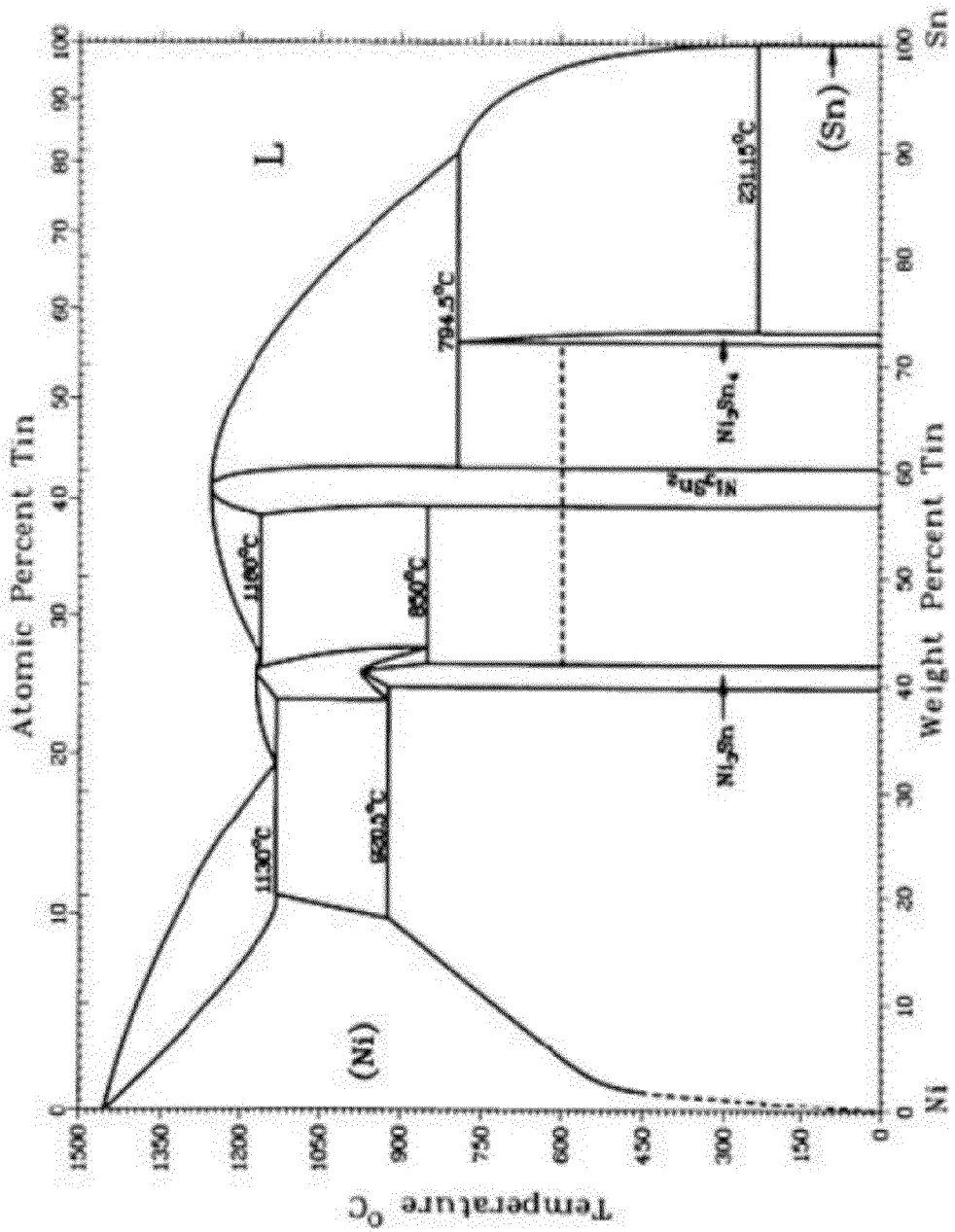
FIG. 9 shows the Ni—Sn binary alloy phase diagram.

Referring to the Ni—Sn phase diagram (FIG. 9) indicates that the ideal case for removal of the melting point depressant Sn from the Bi—Sn alloy would be through the formation of the $Ni_3Sn_4$ intermetallic phase. The $Ni_3Sn_4$ intermetallic phase is the thermodynamically favored phase formed during soldering at temperatures below 300° C. If all of the melting point depressant Sn is desired to be removed, an overall Ni additive metal fraction of at least 13.7 wt % would be preferred. In the present example, a Ni additive metal fraction of 20 wt % of the total metals weight is chosen, and has a mean particle size of 17 μm. The remainder of the solder is comprised of 80 wt % 25-32 μm SnBi eutectic powder, and the metal powders are combined with a no-clean rosin based solder flux commonly employed in the art to form a solder paste. The resultant solder paste is heated to a process temperature of 160° C., which is above the melting point of the SnBi eutectic alloy, causing the Sn—Bi alloy to melt.

After holding at the process temperature for a period of time, the Ni additive metal has reacted with the Sn melting point depressant metal to primarily form the $Ni_3Sn_4$ intermetallic phase, resulting in isothermal solidification of the eutectic liquid as the Sn is removed from said liquid. After all of the melting point depressant Sn has been reacted with the additive Ni, the isothermally solidified base metal consists primarily of Bi. Upon cooling of the solder, no solidification of any liquid occurs as there is no longer any liquid present.

Figure 10:
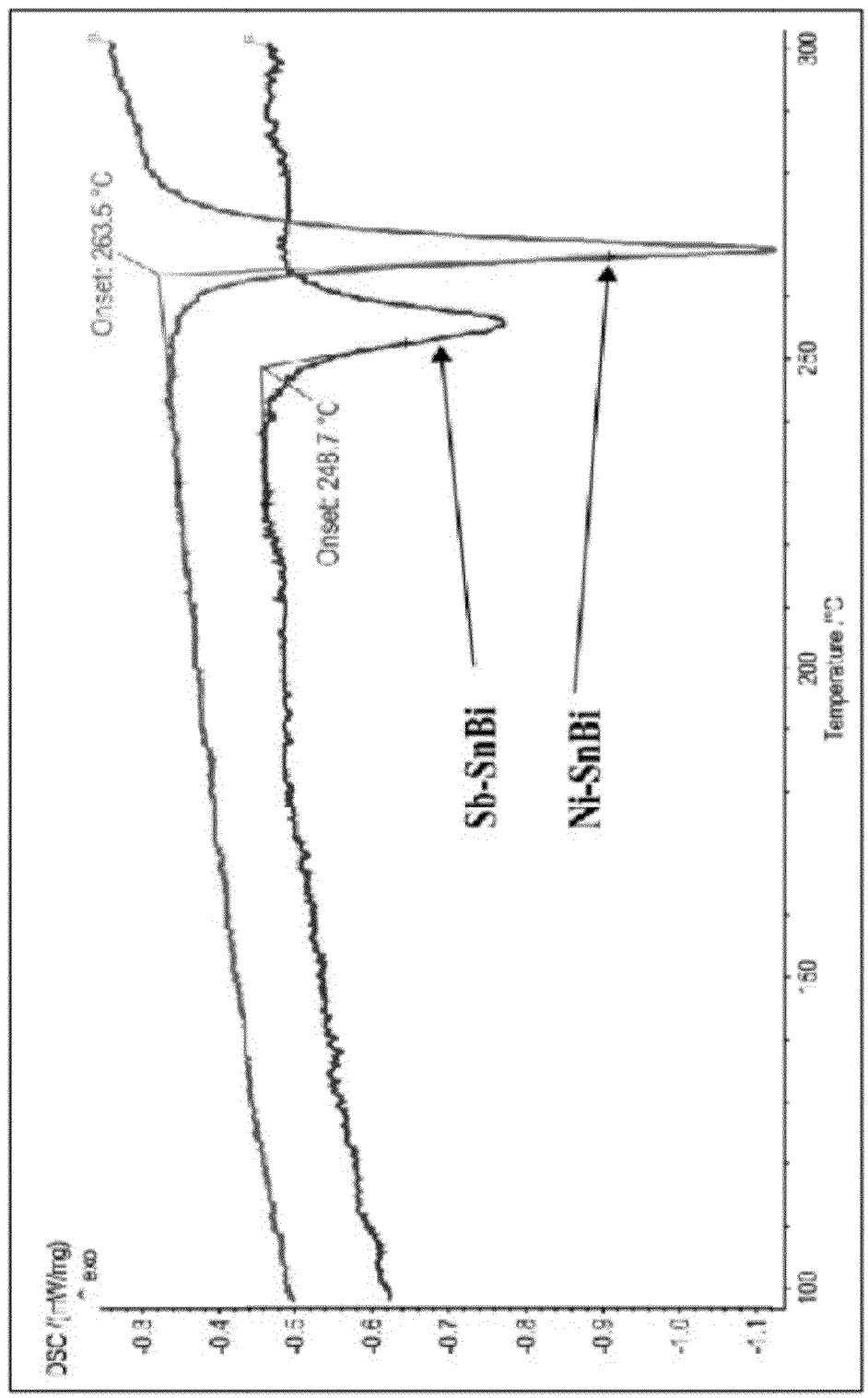
FIG. 10 shows DSC reheat curves for Sb—SnBi and Ni—SnBi compositions after isothermal solidification.

A subsequent reheat of the resultant solder to 300° C. (FIG. 10) shows that the solidus temperature has increased from that of the SnBi eutectic at 139° C., to a solidus temperature above 260° C. The resultant effect of this soldering process is a shift in the melting temperature of the solder composition of at least 100° C. relative to the original process temperature of 160° C.

Figure 11:
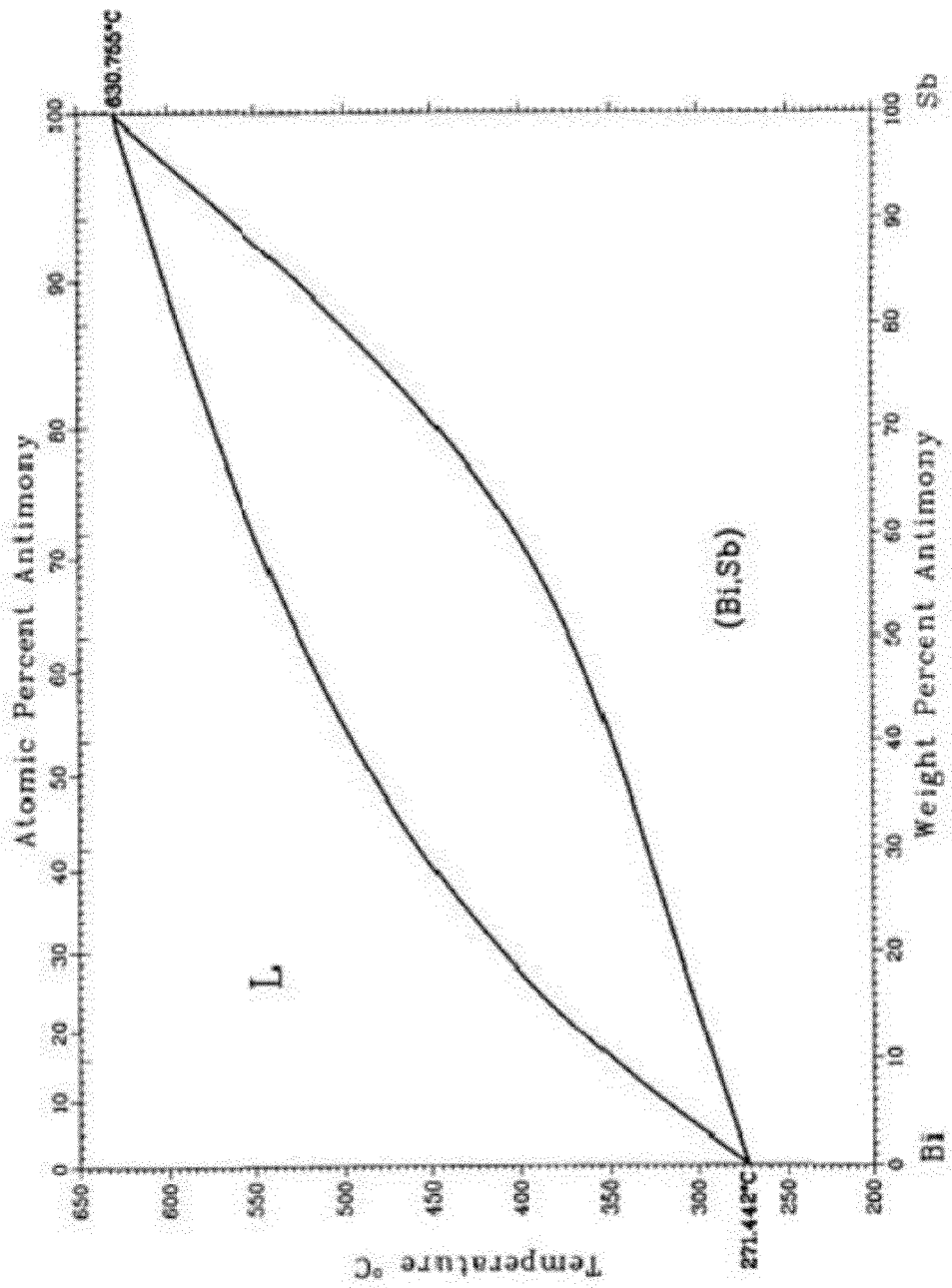
FIG. 11 shows the Bi—Sb binary alloy phase diagram.
Figure 12:
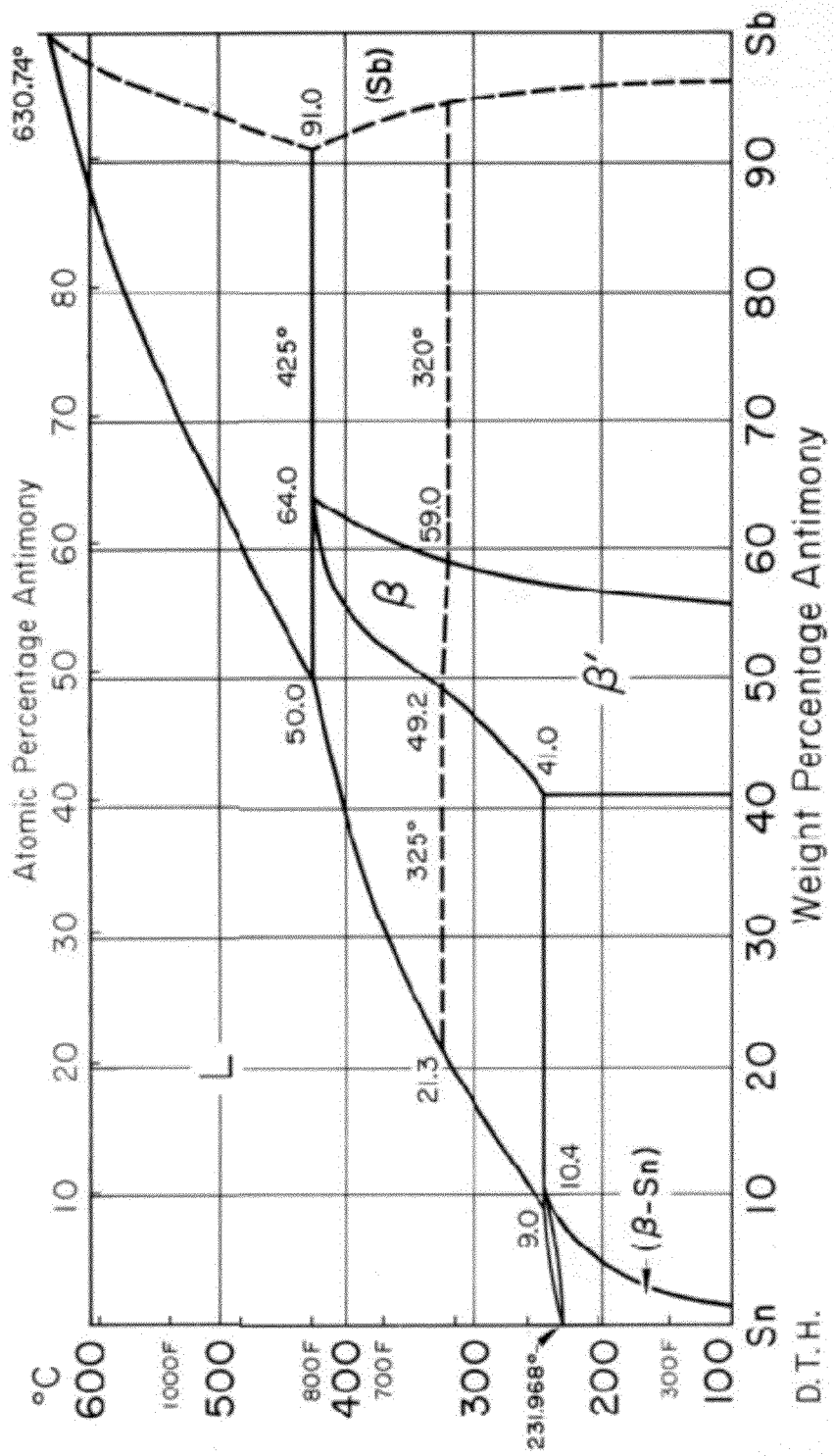
FIG. 12 shows the Sn—Sb binary alloy phase diagram.

Another exemplary embodiment of the present invention is a solder composition of Sb—Sn—Bi, which demonstrates the preferred characteristics of a viable VMP composition. In this example, the base metal, melting point depressant metal, and additive metal are chosen to be Bi, Sn, and Sb respectively. The concentration of melting point depressant Sn alloyed with base metal Bi was again chosen such that the composition of the alloy was 42Sn/58Bi, the eutectic composition having a melting temperature of 139° C. The Sb—Bi phase diagram (FIG. 11) is isomorphous with no intermediate phases present. The Sb—Sn phase diagram (FIG. 12) indicates the presence of an intermediate phase. Knowledge dictates that removal of the melting point depressant metal via solid solution alloying occurs over a much longer time-scale than through intermediate phase formation. Therefore, the formation of the intermetallic Sb—Sn β-phase is thermodynamically favored relative to the solid solution alloying of Bi and Sb.

Analysis of the Sb—Sn phase diagram (FIG. 12) indicates that for removal of the melting point depressant Sn from the Bi—Sn alloy via the formation of the β-phase SbSn intermetallic phase, an overall Sb additive metal fraction of at least 26 wt % is preferred. In the present example, an Sb additive metal fraction of 30 wt % of the total metals weight is chosen, and has a powder size distribution of 25-32 μm. The remainder of the solder is comprised of 70 wt % 25-32 μm SnBi eutectic powder, and the metal powders are combined with a no-clean rosin based solder flux commonly employed in the art to form a solder paste. The resultant solder paste is heated to a process temperature of 160° C., which is above the melting point of the SnBi eutectic alloy, causing the Sn—Bi alloy to melt. After holding at the process temperature for a period of time, the Sb additive metal has reacted with the Sn melting point depressant metal to primarily form the Sb—Sn β-phase intermetallic, resulting in isothermal solidification of the eutectic liquid as the Sn is removed from said liquid. After all of the melting point depressant Sn has been reacted with the additive Sb, the isothermally solidified base metal consists primarily of Bi. Upon cooling of the solder, no solidification of any liquid occurs as there is no longer any liquid present.

A subsequent reheat of the resultant solder to 300° C. (FIG. 10) shows that the solidus temperature has increased from that of the SnBi eutectic at 139° C., to a solidus temperature approaching 250° C. The resultant effect of this soldering process is a shift in the melting temperature of the solder composition of at least 90° C. relative to the original process temperature of 160° C.

Some illustrative examples of VMP solders comprising Ni, Sb, and SnBi are now listed. An exemplary ternary system according to the present invention includes a melting point depressant metal which is Sn, a base metal which is Bi, an additive metal which is Ni, and the composition comprises 13-23 wt % Ni, 44-50 wt % Bi, and 33-37 wt % Sn. In another exemplary ternary system according to the present invention, the melting point depressant metal is Sn, the base metal is Bi, the additive metal is Sb, and the composition comprises 20-30 wt % Sb, 40-46 wt % Bi, and 30-34 wt % Sn. In an exemplary quaternary system according to the present invention, the melting point depressant metal is Sn, the base metal is Bi, the additive metal is a mixture of Ni and Sb, and the composition comprises 1-13 wt % Ni, 1-25 wt % Sb, 43-50 wt % Bi, and 31-36 wt % Sn.

As used herein, the terms "comprises", "comprising", "includes" and "including" are to be construed as being inclusive and open ended, and not exclusive. Specifically, when used in this specification including claims, the terms "comprises", "comprising", "includes" and "including" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiments illustrated. It is intended that the scope of the invention be defined by all of the embodiments encompassed within the following claims and their equivalents.

Therefore what is claimed is:

1. A composition for a variable melting point solder, comprising:
   a) an alloy; said alloy including
      a base metal, and
      a melting point depressant metal Sn, wherein said alloy has an initial solidus temperature; and
   b) an additive metal separate from said alloy, being one of Ni, Sb, or combinations thereof;
   wherein said additive metal is present in an amount such that upon heating the composition to a soldering temperature above said initial solidus temperature, said alloy at least partially melts to form a liquid alloy, whereby said melting point depressant metal Sn dissolved in said liquid alloy reacts with at least said additive metal to remove all of said melting point depressant metal Sn dissolved in said liquid alloy, such that said liquid alloy solidifies isothermally at said soldering temperature to form a resultant solder consisting primarily of said base metal Bi, said resultant solder having a final solidus temperature; and at least one intermetallic compound between said melting point depressant metal Sn and said additive metal, such that said final solidus temperature is greater than said soldering temperature.

2. The composition according to claim 1 wherein the alloy is a eutectic.

3. The composition according to claim 2 wherein the eutectic is SnBi.

4. The composition according to claim 2 wherein the initial solidus temperature is in the range 60° C. to 200° C.

5. The composition according to claim 1 wherein the final solidus temperature is at least 30° C. greater than the initial solidus temperature.

6. The composition according to claim 5 wherein the initial solidus temperature is in the range 60° C. to 200° C.

7. The composition according to claim 5 wherein the final solidus temperature is greater than 230° C.

8. The composition according to claim 1 wherein the resultant solder is substantially free of porosity.

9. The composition according to claim 8 wherein at least a portion of the composition is in the form of a powder, and wherein the additive metal comprises 10-30 wt % of the composition.

10. The composition according to claim 9 wherein the at least a portion of the composition in the form of a powder includes the additive metal, and wherein the additive metal is chosen to have a nonzero preselected mean particle size less than 20 μm.

11. The composition according to claim 8 wherein at least a portion of the composition is in the form of a metallization, metal layer or metal coating, and wherein the additive metal comprises 10-95 wt % of the composition.

12. The composition according to claim 1 wherein at least a portion of the composition is in the form of a powder, and wherein the additive metal comprises 10-30 wt % of the composition.

13. The composition according to claim 12 wherein the at least a portion of the composition in the form of a powder includes the additive metal, and wherein the additive metal is chosen to have a nonzero preselected mean particle size less than 20 μm.

14. The composition according to claim 1 wherein at least a portion of the composition is in the form of a metallization, metal layer or metal coating, and wherein the additive metal comprises 10-95 wt % of the composition.

15. The composition according to claim 1 wherein said additive metal is Ni, and wherein said composition comprises 13-23 wt % Ni, 44-50 wt % Bi, 33-37 wt % Sn.

16. The composition according to claim 1 wherein said additive metal is Sb, and wherein said composition comprises 20-30 wt % Sb, 40-46 wt % Bi, 30-34 wt % Sn.

17. The composition according to claim 1 wherein said additive metal is a mixture of Ni and Sb, and wherein said composition comprises 1-13 wt % Ni, 1-25 wt % Sb, 43-50 wt % Bi, 31-36 wt % Sn.

18. The composition according to claim 1 wherein the additive metal, and the alloy are each in a form selected from the group consisting of metallization, metal layer, metal coating, powder, foil, preform, ribbon, wire, and sheet.

19. The composition according to claim 1 wherein at least a portion of the composition is in the form of a powder.

20. The composition according to claim 19 wherein the powder is tape cast into a preselected shape.

21. The composition according to claim 19 wherein the powder is dispersed in at least a flux to form a paste.

22. The composition according to claim 21 wherein at least a portion of the composition is in the form of a metallization, metal layer or metal coating, and wherein the paste is applied adjacent to said metallization, metal layer or metal coating.

23. The composition according to claim 19 wherein said at least a portion of the composition includes the additive metal, and wherein the additive metal is dispersed uniformly throughout the composition.

24. The composition according to claim 1 further comprising at least one element selected from the group consisting of Ag, Al, As, Au, B, Be, Bi, C, Ca, Ce, Co, Cr, Cu, Fe, Ga, Ge, H, In, La, Mg, Mo, Mn, N, Nb, Ni, O, P, Pd, Po, Pt, Re, Rh, Sb, Se, Si, Sn, Te, Ti, Tl, V, W, Zn and Zr.

25. The composition according to claim 24 wherein said at least one element comprises less than 10 wt % of said composition.

* * * * *